United States Patent Office 3,516,999
Patented June 23, 1970

1

3,516,999
BENZIMIDAZOLE DERIVATIVES
Hideo Kano, Kyoto-shi, Shiro Takahashi, Suita-shi, Ryonosuke Kido, Toyonaka-shi, and Katsumi Hirose, Nishinomiya-shi, Japan, assignors to Shionogi & Co., Ltd., Osaka, Japan
No Drawing. Filed Mar. 24, 1967, Ser. No. 625,610
Int. Cl. C07d 49/38
U.S. Cl. 260—247.5                                      22 Claims

ABSTRACT OF THE DISCLOSURE 1-(tertiary-aminoalkoxy)-benzimidazoles being unsubstituted or substituted by a lower alkoxy group at the 2 position and unsubstituted or substituted by a member selected from the group consisting of a lower alkyl, a lower alkoxy, a nitro and a halogen at the 4-, 5-, 6-, or 7-position, being prepared by an interaction of a corresponding benzimidazole-1-oxide with a reactive ester of (tertiary-amino)-alkanol, and having strong analgesic, anti-inflammatory, antipyretic and antitussive activities with a low toxicity.

---

The present invention relates to benzimidazole derivatives. More particularly, it relates to 1-(tertiary-amino alkoxy)-benzimidazole derivatives represented by the following formula:

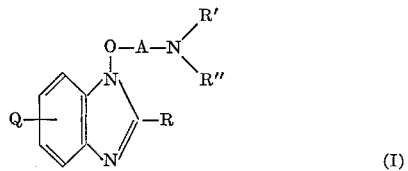

and to pharmaceutically acceptable non-toxic salts thereof.

In the above Formula I, R is a hydrogen atom or a lower alkoxy group (e.g. methoxy, ethoxy, propoxy, isopropoxy, butoxy, isobutoxy). Q is a member selected from the group consisting of a hydrogen atom, a lower alkyl group (e.g. methyl, ethyl, propyl, isopropyl, butyl, isobutyl), a lower alkoxy group (e.g. methoxy, ethoxy, propoxy, isopropoxy, butoxy, isobutoxy), a nitro group and a halogen atom (e.g. chlorine, bromine, iodine). A is a straight or branched lower alkylene group (e.g. methylene, ethylene, propylene, isopropylene, butylene, isobutylene). R' and R" are each a lower alkyl group (e.g. methyl, ethyl, propyl, isopropyl, butyl, isobutyl) or, when taken together with the adjacent nitrogen atom, they represent a 5- to 7-membered monocyclic heterocyclic group containing, if desired, an oxygen, sulfur or an additional nitrogen atom, such as pyrrolidino, piperidino, piperazino, morpholino and thiomorpholino. That is, R' and R" may represent together a tetramethylene, pentamethylene, oxatetramethylene, oxapentamethylene, azatetramethylene, azapentamethylene, thiatetramethylene or thiapentamethylene chain.

The above illustrated compounds are novel, and it has been discovered that they are useful as analgesic, anti-inflammatory, antipyretic and antitussive agents.

Accordingly, an object of the present invention is to provide novel benzimidazole derivatives. Another object of the present invention is to provide benzimidazole derivatives and pharmaceutically acceptable non-toxic salts thereof showing analgesic, anti-inflammatory, antipyretic and antitussive activities. A further object of the invention is to provide a process for preparing the novel benzimidazole derivatives. A still further object of the present invention is to provide pharmaceutical compositions comprising the benzimidazole derivatives or the pharmaceutically acceptable non-toxic salts thereof.

2

These and other objects and the manner in which they are accomplished will become apparent to those conversant with the art from the following description of the general class of compounds and certain specific examples of particular members as well as general and specific methods for their production.

According to the present invention, the benzimidazole derivatives (I) can be prepared by an interaction of a benzimidazole-1-oxide (II) with a reactive ester of (tertiary-amino)-alkanol (III) in an inert solvent at a temperature from an ambient temperature to the reflux temperature of the solvent, if desired, in the presence of an acid-eliminating agent, as illustrated by the following scheme:

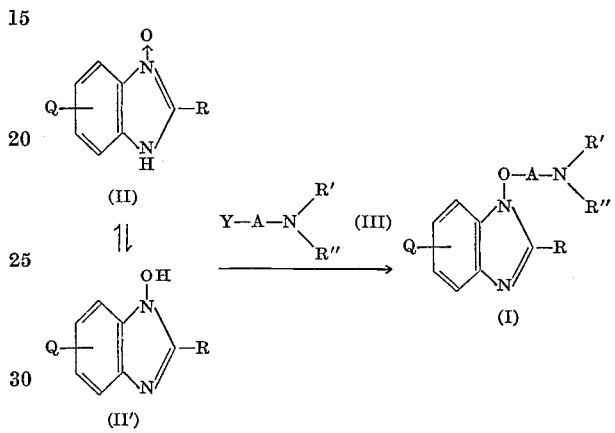

wherein Y is a residue of the reactive ester, and R, R', R", Q and A each has the same significance as designated above.

The one starting material (II) can also exist as its tautomeric isomer, a 1-hydroxyl compound (II') under certain conditions. But, it should be noted that this starting material is denominated as a 1-oxide compound (II) in the present specification, the tautomerism being disregarded for the convenience of illustration.

Among the starting materials (II), those of which R is a hydrogen atom can be, for instance, prepared by reducing an o-nitro-formanilide (IV) with sodium borohydride in the presence of a catalyst such as palladium-carbon as shown in the following scheme:

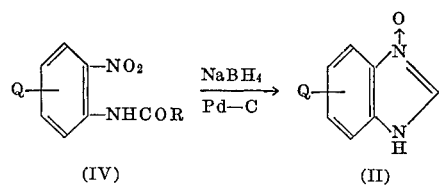

wherein Q has the same significance as designated above.

On the other hand, the starting materials (II) of which R is a lower alkoxy group can be, for instance, prepared by treating a 3-lower alkoxyquinoxaline-1-oxide (V) with hydrogen peroxide in an alkaline medium as shown in the following scheme:

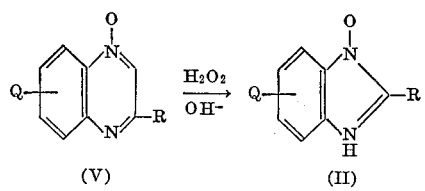

wherein R is a lower alkoxy group and Q has the same significance as designated above.

Examples of the starting material, namely the benzimidazole-1-oxide (II), include benzimidazole-1-oxide, 2-methoxybenzimidazole-1-oxide, 6-methoxybenzimidazole-1-oxide, 2,6-dimethoxybenzimidazole-1-oxide, 4-chlorobenzimidazole-1-oxide, 6-nitrobenzimidazole-1-oxide, 4-methylbenzimidazole-1-oxide and 2-ethoxy-4-chlorobenzimidazole-1-oxide.

The other starting material of the present invention is a reactive ester of (tertiary-amino)-alkanol (III), wherein the reactively esterified hydroxyl group represented by Y is preferably a hydroxyl group esterified with a strong inorganic acid such as hydrochloric, hydrobromic, hydroiodic or sulfuric acid, or a strong organic acid such as methanesulfonic, ethanesulfonic, benzenesulfonic or toluenesulfonic acid. Examples of the (tertiary-amino)-alkanol include dimethylaminomethanol,
dimethylaminoethanol,
dimethylaminopropanol,
dimethylaminoisopropanol,
dimethylaminobutanol,
dimethylaminoisobutanol,
diethylaminomethanol,
dipropylaminobutanol,
methylethylaminopropanol,
pyrrolidinomethanol,
pyrrolidinoethanol,
pyrrolidinopropanol,
piperidinomethanol,
piperidinopropanol,
N-methylpiperazinoethanol,
morpholinomethanol,
morpholinoethanol,
morpholinopropanol,
thiomorpholinoethanol,
thiomorpholinopropanol and
thiomorpholinobutanol.

As mentioned above, the interaction of the benzimidazole-1-oxide (II) with the aminoalkanol derivative (III) may be carried out in an inert solvent at a wide range of temperature, if desired, in the presence of a basic substance as acid eliminating agent. The inert solvent to be employed as the reaction medium may be selected, for instance, from benzene, ether, tetrahydrofuran, dioxane, acetone, methylethyl ketone, dimethylformamide, dimethylsulfoxide, ethyl acetate, an alkanol, an aqueous alkanol and water giving consideration to the solubility of the starting materials. The reaction temperature may be selected, for instance, from an ambient temperature to the reflux temperature of the reaction medium employed. Examples of the basic substance are organic bases such as pyridine bases (e.g. pyridine, picoline, lutidine, collidine) and aliphatic amines (e.g. trimethylamine, triethylamine) and inorganic bases such as alkali metal hydroxides (e.g. sodium hydroxide, potassium hydroxide), alkali metal alkoxide (e.g. sodium methoxide, sodium ethoxide, potassium methoxide), alkali metal carbonates (e.g. sodium carbonate, potassium carbonate), alkali metal hydrogen carbonate (e.g. sodium hydrogen carbonate, potassium hydrogen carbonate) and alkali metal carboxylates (e.g. sodium acetate, potassium acetate). The basic substance may be used in the form of a mixture, suspension or solution in the said inert organic solvent or, in the case of liquid, alone. When the starting amine compound (III) is liquid, the use of excess of the same may be preferred, because it can be available not only as the reagent but also as the reaction solvent and the acid eliminating agent.

Specific examples of the objective benzimidazole derivatives (I) prepared by the present process are 1-dimethylaminomethoxybenzimidazole,
1-diethylaminomethoxybenzimidazole,
1-(2-dimethylaminoethoxy)-benzimidazole,
1-(2-diethylaminoethoxy)-benzimidazole,
1-(3-diethylaminopropoxy)-benzimidazole,
1-(4-diethylaminobutoxy)-benzimidazole,
1-(2-pyrrolidinoethoxy)-benzimidazole,
1-(2-piperidinoethoxy)-benzimidazole,
1-(2-morpholinoethoxy)-benzimidazole,
1-(2-thiomorpholinoethoxy)-benzimidazole,
1-(2-pyrrolidinopropoxy)-benzimidazole,
1-(3-piperidinopropoxy)-benzimidazole,
1-(3-morpholinopropoxy)-benzimidazole,
1-[3-(N-methylpiperazino)-propoxy]-benzimidazole,
1-(2-dimethylaminomethoxy)-2-methoxybenzimidazole,
1-(2-diethylaminoethoxy)-2-methoxybenzimidazole,
1-(2-pyrrolidinoethoxy)-2-methoxybenzimidazole,
1-(2-thiomorpholinoethoxy-2-methoxybenzimidazole,
1-(2-piperidinopropoxy)-2-methoxybenzimidazole,
1-(2-morpholinopropoxy)-2-methoxybenzimidazole,
1-(2-dimethylaminomethoxy)-2,6-dimethoxybenzimidazole,
1-(2-diethylaminoethoxy)-2,6-dimethoxybenzimidazole,
1-(2-pyrrolidinoethoxy)-2,6-dimethoxybenzimidazole,
1-(2-thiomorpholinoethoxy)-2,6-dimethoxybenzimidazole,
1-(3-piperidinopropoxy)-2,6-dimethoxybenzimidazole,
1-(2-morpholinoethoxy)-2,6-dimethoxybenzimidazole,
1-(2-dimethylaminopropoxy)-4-chlorobenzimidazole,
1-(2-diethylaminoethoxy)-4-chlorobenzimidazole,
1-(2-pyrrolidinoethoxy)-4-chlorobenzimidazole,
1-(3-piperidinopropoxy)-4-chlorobenzimidazole,
1-(3-morpholinopropoxy)-4-chlorobenzimidazole,
1-(2-dimethylaminomethoxy)-6-nitrobenzimidazole,
1-(2-diethylaminoethoxy)-6-nitrobenzimidazole,
1-(2-pyrrolidinoethoxy)-6-nitrobenzimidazole,
1-(3-piperidinopropoxy)-6-nitrobenzimidazole,
1-(3-morpholinopropoxy)-6-nitrobenzimidazole,
1-dimethylaminomethoxy-4-methylbenzimidazole,
1-(2-diethylaminoethoxy)-4-methylbenzimidazole,
1-(2-pyrrolidinoethoxy)-4-methylbenzimidazole,
1-(3-piperidinopropoxy)-4-methylbenzimidazole,
1-(3-morpholinopropoxy)-4-methylbenzimidazole,
1-(2-dimethylaminoethyl)-2-ethoxy-4-chlorobenzimidazole,
1-(3-diethylaminopropoxy)-2-ethoxy-4-methylbenzimidazole,
1-(2-pyrrolidinoethoxy)-2-ethoxy-6-nitrobenzimidazole,
1-(3-piperidinopropoxy)-2-ethoxy-6-ethoxybenzimidazole,
1-(4-morpholinobutoxy)-2-propoxy-6-methoxybenzimidazole,
etc.

The thus prepared benzimidazole derivatives (I) are liquid or solid in the free state. For convenience of preparation, they may be converted into acid addition salts or quaternary salts, for instance by treating the base with an acid such as hydrochloric hydrobromic, hydroiodic, sulfuric, nitric, phosphoric, thiocyanic, carbonic, oxalic, citric, tartaric, succinic, salicylic, benzoic, palmitic, tannic or naphthalenesulfonic acid or a quaternizing agent such as methyl chloride, ethyl chloride, ethyl bromide, methyl iodide, ethyl iodide or phenethyl bromide in a suitable solvent such as water, methanol, ethanol, ether, benzene and toluene. There are thus produced the corresponding hydrochloride, hydrobromide, hydroiodide, sulfate nitrate, phosphate, thiocyanate, carbonate, oxalate, citrate, tartrate, succinate, salicylate, benzoate, palmitate, tannate on naphthalenesulfonate, or the corresponding methyl ammonium chloride, ethyl ammonium chloride, ethyl ammonium iodide or phenethyl ammonium bromide.

The benzimidazole derivatives (I) and non-toxic salts thereof are useful as antipyretic, analgesic, antitussive and anti-inflammatory agents. For instance, as shown in the following table, the pharmacological properties of 1-(2-piperidinoethoxy)-benzimidazole dihydrochloride are superior to those of a commercially available agent, aminopyrine.

PHARMACOLOGICAL PROPERTIES

| Activity | 1-(2-piperi-dinoethoxy)-benzimidazole dihydrochloride | Aminopyrine |
|---|---|---|
| Analgesic [1] $ED_{50}$ (mg./kg.) | 45 | 102 |
| Anti-inflammatory [2] (percent) | 46 | 22 |
| Antipyretic [3] (°C.) | −5.5 | −3.2 |
| Antitussive [4] $ED_{50}$ (mg./kg.) | 43 | |
| Toxicity [5] $LD_{50}$ (mg./kg.) | 617 | 373 |

[1] Analgesic activity was determined according to the modified Haffner's method by subcutaneous administration in mice.
[2] Anti-inflammatory activity is presented by inhibition percentage of edema (produced by Formalin) in rats, when subcutaneously treated with a dose of 100 mg./kg. of the test compound.
[3] Antipyretic activity is presented by depression of the bodily temperature in mice, when subcutaneously treated with a dose of 100 mg./kg. of the test compound.
[4] Antitussive activity was determined subcutaneously in guinea-pigs by inhibition of coughing caused by ammonia gas.
[5] Toxicity was determined in mice by subcutaneous administration.

The other compounds produced by the process of the present invention show similar activities and are useful as medicaments. They can be administered in a variety of per se conventional ways, e.g. in the form of tablets constituted e.g. by an effective does of active compound of the invention and a major proportion of a per se conventional carrier.

The following examples illustrate methods of carrying out the present invention. In the examples which follow, parts by weight bear the same relation to parts by volume as do grams to millilitres. The temperatures are set forth in degrees centigrade. The abbreviations have conventional significances.

Example 1

To a solution of benzimidazole-1-oxide (4 parts by weight) and sodium hydroxide (4 parts by weight) in methanol (200 parts by volume) is added dropwise another solution of 2-dimethylaminoethyl bromide hydrobromide (14 parts by weight) in methanol (50 parts by volume) at 50° C. with stirring, and the mixture is stirred at 50° C. for 1 hour. After removal of the solvent, water (50 parts by volume) is added to the residue and extracted with chloroform. The chloroform residue is purified by chromatography on alumina to give 1-(2-dimethylaminoethoxy)-benzimidazole (5 parts by weight) as a colorless oily substance.

The oily product is dissolved in 20% hydrochloric acid-ethanol (30 parts by volume) and evaporated under reduced pressure. Recrystallization from ethanol-ethyl acetate gives 1-(2-dimethylaminoethoxy)-benzimidazole dihydrochloride as colorless prisms, of which melting point cannot be determined because of its hygroscopicity.

Analysis.—Calcd. for $C_{11}H_{15}ON_3 \cdot 2HCl$ (percent): C, 47.48; H, 6.17; N, 15.11. Found (percent): C, 47.57; H, 6.36; N, 14.91.

Example 2

To a solution of benzimidazole-1-oxide (10 parts by weight) and sodium hydroxide (7.4 parts by weight) in a mixture of water (20 parts by volume) and methanol (450 parts by volume) is added another solution of 3-dimethylaminopropyl chloride (20 parts by weight) in toluene (200 parts by volume), and the mixture is refluxed for 1 hour. After removal of the solvent, water (100 parts by volume) is added to the residue and extracted with ether. The extract is dried over anhydrous sodium sulfate and evaporated to give 1-(3-dimethylaminopropoxy)-benzimidazole (15 parts by weight) as a colorless oily substance.

The oily product is dissolved in 20% hydrochloric acid-ethanol (50 parts by volume) and evaporated under reduced pressure. Recrystallization from ethanol-ethyl acetate gives 1-(3-dimethylaminopropoxy)-benzimidazole dihydrochloride (17 parts by weight) as colorless prisms, melting at 166 to 167° C.

Analysis.—Calcd. for $C_{12}H_{17}ON_3 \cdot 2HCl$ (percent): C, 49.32; H, 6.55; N, 14.38. Found (percent): C, 49.60; H, 6.81; N, 14.22.

Example 3

To a solution of benzimidazole-1-oxide (20 parts by weight) and sodium hydroxide (15 parts by weight) in a mixture of water (30 parts by volume) and methanol (200 parts by volume) is added 2-pyrrolidinoethyl bromide hydrobromide (42.5 parts by weight), and the reaction is carried out in a similar manner to the preceding example to give 1-(2-pyrrolidinoethoxy)-benzimidazole (11 parts by weight).

The free base is treated with hydrochloric acid in a similar manner to the preceding example and recrystallized from ethanol-ethyl acetate to give 1-(2-pyrrolidinoethoxy)-benzimidazole dihydrochloride (12 parts by weight) as colorless prisms, melting at 160 to 161° C.

Analysis.—Calcd. for $C_{13}H_{17}ON_3 \cdot 2HCl$ (percent): C, 51.32; H, 6.30; N, 13.81. Found (percent): C, 51.28; H, 6.40; N, 13.72.

Example 4

To a solution of benzimidazole-1-oxide (6.7 parts by weight) and sodium hydroxide (4 parts by weight) in a mixture of water (15 parts by volume) and methanol (100 parts by volume) is added 2-piperidinoethyl bromide hydrobromide (13.4 parts by weight), and the reaction is carried out in a similar manner to the Example 2 to give 1-(2-piperidinoethoxy)-benzimidazole (7.8 parts by weight). Recrystallization from petroleum ether gives colorless prisms, melting at 58 to 59° C.

Analysis.—Calcd. for $C_{14}H_{19}ON_3$ (percent): C, 68.54; H, 7.81; N, 17.13. Found (percent): C, 68.39; H, 7.89; N, 16.74.

The free base is treated with hydrochloric acid in a similar manner to the Example 2 and recrystallized from ethanol-ethyl acetate to give 1-(2-piperidinoethoxy)-benzimidazole dihydrochloride (11 parts by weight) as colorless needles, melting at 189 to 191° C.

Analysis—Calcd. for $C_{14}H_{19}ON_3 \cdot 2HCl$ (percent): C, 52.67; H, 6.95; N, 13.16. Found (percent): C, 52.79; H, 6.95; N, 12.83.

Example 5

To a solution of 6-nitrobenzimidazole-1-oxide (7 parts by weight) and sodium hydroxide (4 parts by weight) in a mixture of water (10 parts by volume) and methanol (100 parts by volume) is added 2-piperidinoethyl bromide hydrobromide (12.5 parts by weight), and the reaction is carried out in a similar manner to the Example 2 to give 1-(2-piperidinoethoxy)-6-nitrobenzimidazole (7 parts by weight).

The free base is treated with hydrochloric acid in a similar manner to the Example 2 and recrystallized from ethanol to give 1-(2-piperidinoethoxy)-6-nitrobenzimidazole hydrochloride (7 parts by weight) as colorless prisms, melting at 219 to 220° C.

Analysis.—Calcd. for $C_{14}H_{18}O_3N_4 \cdot HCl$ (percent): C, 51.45; H, 5.86; N, 17.15. Found (percent): C, 51.88; H, 6.05; N, 16.94.

Example 6

To a solution of benzimidazole-1-oxide (15 parts by weight) and sodium hydroxide (9.2 parts by weight) in a mixture of water (30 parts by volume) and methanol (200 parts by volume) is added 3-piperidinopropyl bromide hydrobromide (34.6 parts by weight), and the reaction is carried out in a similar manner to the Example 2 to give 1-(3-piperidinopropoxy)-benzimidazole (15 parts by weight).

The free base is treated with hydrochloric acid in a similar manner to the Example 2 and recrystallized from ethanol-ethyl acetate to give 1-(3-piperidinopropoxy)-benzimidazole hydrochloride (16 parts by weight) as colorless prisms, melting at 202 to 203° C.

Analysis.—Calcd. for $C_{15}H_{21}ON_3 \cdot HCl$ (percent): C, 60.90; H, 7.50; N, 14.21. Found (percent): C, 60.97; H, 7.56; N, 14.05.

Example 7

To a solution of benzimidazole-1-oxide (12 parts by weight) and sodium hydroxide (7.2 parts by weight) in a mixture of water (15 parts by volume) and methanol (200 parts by volume) is added 2-morpholinoethyl bromide hydrobromide (24.1 parts by weight), and the reaction is carried out in a similar manner to the Example 2 to give 1-(2-morpholinoethoxy)-benzimidazole (7.5 parts by weight).

The free base is treated with hydrochloric acid in a similar manner to the Example 2 and recrystallized from ethanol-ethyl acetate to give 1-(2-morpholinoethoxy)-benzimidazole dihydrochloride (5 parts by weight) as colorless prisms, melting at 208 to 210° C.

*Analysis.*—Calcd. for $C_{13}H_{17}O_2N_3 \cdot 2HCl$ (percent): C, 48.78; H, 5.98; N, 13.12. Found (percent): C, 48.89; H, 6.26; N, 13.52.

Example 8

To a solution of 2-methoxybenzimidazole-1-oxide (8.8 parts by weight) and sodium hydroxide (1 part by weight) in a mixture of water (5 parts by volume) and methanol (100 parts by volume) is added 2-piperidinoethyl bromide hydrobromide (15.8 parts by weight), and the reaction is carried out in a similar manner to the Example 2 to give 1-(2-piperidinoethoxy)-2-methoxybenzimidazole (11 parts by weight).

The free base is treated with hydrochloric acid in a similar manner to the Example 2 and recrystallized from ethanol-ethyl acetate to give 1-(2-piperidinoethoxy)-2-methoxybenzimidazole hydrochloride (12 parts by weight) as colorless prisms, melting at 127 to 128° C.

*Analysis.*—Calcd. for $C_{15}H_{21}O_2N_3 \cdot HCl \cdot \frac{2}{3}H_2O$ (percent): C, 55.63; H, 7.28; N, 12.98. Found (percent): C, 55.50; H, 7.08; N, 13.27.

What is claimed is:

1. A member selected from the group consisting of compounds of the formula

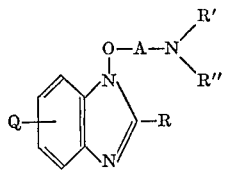

and pharmaceutically acceptable acid addition salts thereof, wherein A is lower alkylene, Q is a member selected from the group consisting of hydrogen atom lower alkyl, lower alkoxy, nitro, chlorine, bromine and iodine, R is a member selected from the group consisting of hydrogen atom and lower alkoxy, and R' and R'' each is lower alkyl.

2. A member selected from the group consisting of compounds of the formula

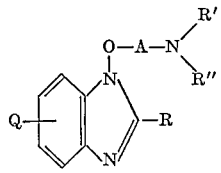

and pharmaceutically acceptable acid addition salts thereof, wherein A is lower alkylene, Q is a member selected from the group consisting of hydrogen atoms, lower alkyl, lower alkoxy, nitro, chlorine, bromine and iodine, R is a member selected from the group consisting of hydrogen atom and lower alkoxy, and R' and R'' together with the nitrogen atom to which they are attached represent a member selected from the group consisting of pyrrolidino, piperidino, piperazino, morpholino and thiomorpholino radicals.

3. A compound according to claim 1, namely, 1-(di-(lower)alkylamino-(lower)alkoxy)-benzimidazole.

4. A compound according to claim 1, namely, 1-(di-(lower)alkylamino - (lower)alkoxy) - 2-(lower)alkoxybenzimidazole.

5. A compound according to claim 1, namely, 1-(di-(lower)alkylamino-(lower)alkoxy)-6-nitrobenzimidazole.

6. A compound according to claim 2, namely, 1-(pyrrolidino-(lower)alkoxy)-benzimidazole.

7. A compound according to claim 2, namely, 1-(pyrrolidino-(lower)alkoxy)-2-(lower)alkoxy-benzimidazole.

8. A compound according to claim 2, namely, 1-(pyrrolidino-(lower)alkoxy)-6-nitrobenzimidazole.

9. A compound according to claim 2, namely, 1-(piperidino(lower)alkoxy)-benzimidazole.

10. A compound according to claim 2, namely, 1-(piperidino-(lower)alkoxy-2-(lower)alkoxy - benzimidazole.

11. A compound according to claim 2, namely, 1-(piperidino-(lower)alkoxy)-6-nitrobenzimidazole.

12. A compound according to claim 2, namely, 1-(morpholino-(lower)alkoxy)-benzimidazole.

13. A compound according to claim 2, namely, 1- (morpholino-(lower)alkoxy)-2-(lower)alkoxy-benzimidazole.

14. A compound according to claim 2, namely, 1-(morpholino-(lower)alkoxy)-6-nitrobenzimidazole.

15. A compound according to claim 2, namely, 1-(2-dimethylaminoethoxy)-benzimidazole.

16. A compound according to claim 2, namely, 1-(3-dimethylaminopropoxy)-benzimidazole.

17. A compound according to claim 2, namely, 1-(2-pyrrolidinoethoxy)-benzimidazole.

18. A compound according to claim 2, namely, 1-(2-piperidinoethoxy)-benzimidazole.

19. A compound according to claim 2, namely, 1-(2-piperidinoethoxy)-2-methoxybenzimidazole.

20. A compound according to claim 2, namely, 1-(2-piperidinoethoxy)-6-nitrobenzimidazole.

21. A compound according to claim 2, namely, 1-(3-piperidinopropoxy)-benzimidazole.

22. A compound according to claim 2, namely, 1-(2-morpholinoethoxy)-benzimidazole.

References Cited

UNITED STATES PATENTS 3,300,505   1/1967   de Stevens _____ 260—247.5

ALEX MAZEL, Primary Examiner

A. M. T. TIGHE, Assistant Examiner

U.S. Cl. X.R.

260—243, 247.1, 247.2, 250, 268, 293.4, 294, 294.7, 309.2; 424—200, 232, 246, 248, 250, 267, 273